March 12, 1963    A. BRUEDER    3,081,131
SEAT STRUCTURE
Filed Jan. 3, 1961    4 Sheets-Sheet 1
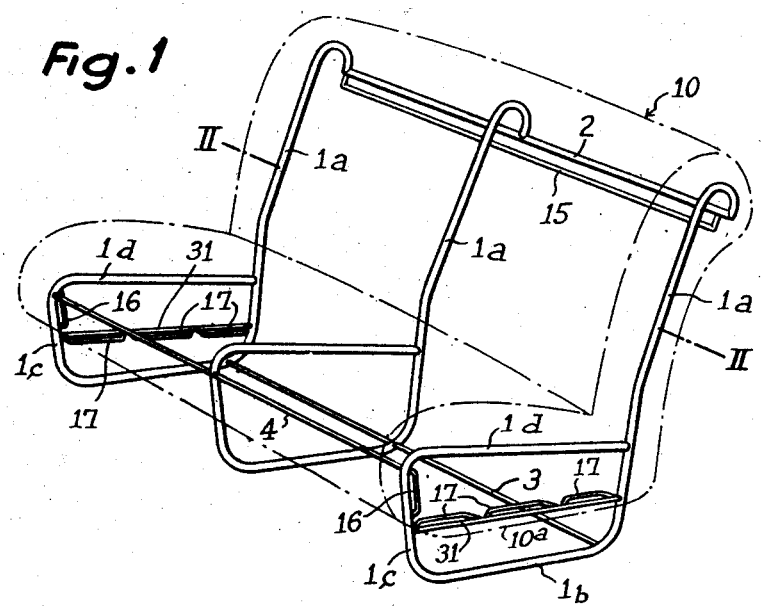
Fig. 1
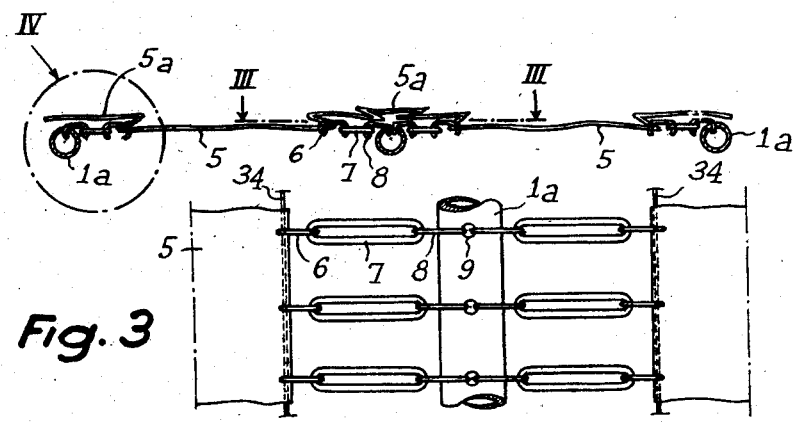
Fig. 2
Fig. 3

March 12, 1963  A. BRUEDER  3,081,131
SEAT STRUCTURE

Filed Jan. 3, 1961  4 Sheets-Sheet 2

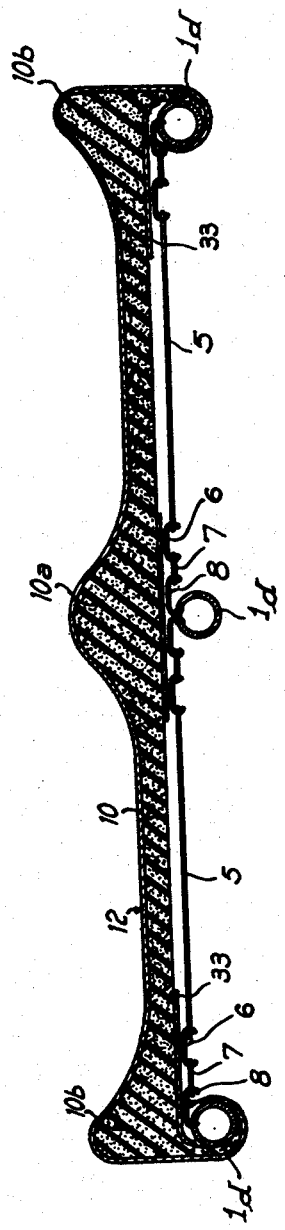

United States Patent Office 3,081,131
Patented Mar. 12, 1963

3,081,131
SEAT STRUCTURE
Antoine Brueder, Paris, France, assignor to Societe
Anonyme Andre Citroen, Paris, France
Filed Jan. 3, 1961, Ser. No. 80,388
Claims priority, application France Jan. 13, 1960
9 Claims. (Cl. 297—455)

This invention relates to novel seat structures especially though not exclusively suitable for automotive vehicles. An object of the invention is to provide an improved construction of seats for vehicles or the like which will be lightweight and inexpensive, yet stable and comfortable, and attractive in aspect.

Heretofore vehicle seats have usually included a metallic frame and padding, upholstery or cushions or the like mounted on the frame by way of spring structures. The construction of such seats has been made difficult and expensive especially owing to the necessity of providing the complicated spring structures with their lengths of intricately shaped wire. Sometimes, inexpensive types of seat structures have been used in which webbing is stretched directly across the metallic frame members to constitute the backs and seat portions of the structures. But seats thus constructed are uncomfortable and unattractive. It is, hence, an object of this invention to provide a seat structure for motor-cars and the like which will have all of the high comfort and attractiveness of conventional sprung and padded seats, while being much more inexpensive to make.

In accordance with an aspect of the invention there is provided a seat structure comprising a rigid, e.g. tubular metallic frame, having a seat portion and a back portion, webbing stretched across the seat and back portions of the frame and resilient connector means connecting the webbing and frame, and a pre-shaped padding structure having a seat portion and a back portion fitted over the seat and back portions of said frame and over said webbing. Preferably, there is further provided a cover fabric stretched over the outer surfaces of said padding and attached to the frame.

The above and further objects, features and advantages of the invention will become apparent as the disclosure proceeds. Exemplary embodiments of the invention will now be described for purposes of illustration but not of limitation with reference to the accompanying drawings, wherein:

FIG. 1 is a perspective view of the metallic frame structure of an improved seat structure according to one form of embodiment of the invention, with the outline of the padding being shown in dot-and-dash lines;

FIG. 2 is a section on line II—II of FIG. 1 showing the webbing and connecting means thereof;

FIG. 3 is a section on line III—III of FIG. 2, on an enlarged scale;

FIG. 10 is a sectional view of the seat structure in a modification of the embodiment shown in FIGS. 1–4, using the same tubular frame structure as in that embodiment.

Figure 4:
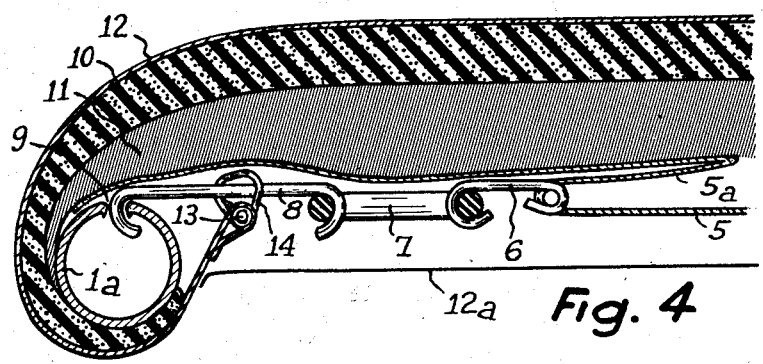
FIG. 4 is a view, on a further enlarged scale, of a detail enclosed in the circle designated IV in FIG. 2.
Figure 5:
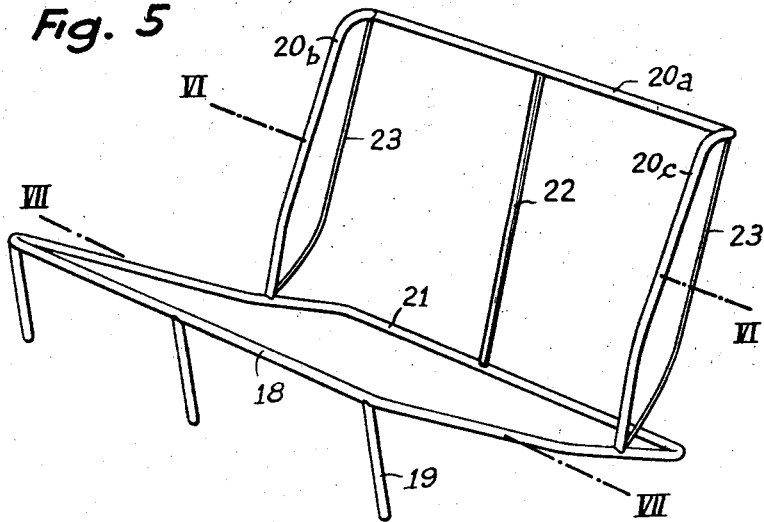
FIG. 5 is a perspective view of the metallic frame in another embodiment of the invention.
Figure 6:
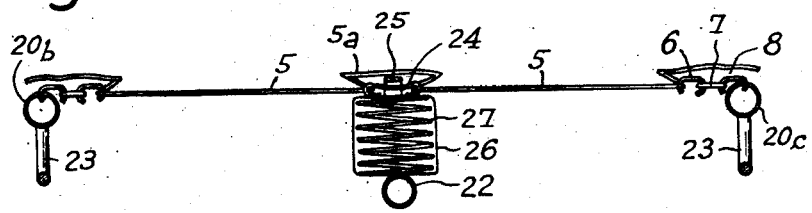
FIG. 6 is a sectional view on line VI—VI of FIG. 5 showing the webbing and connecting means thereof in this embodiment.
Figure 7:
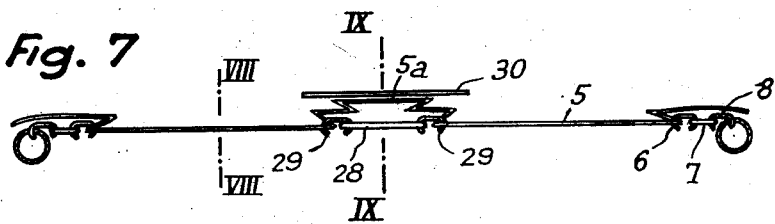
FIG. 7 is a section on line VII—VII of FIG. 5, showing the webbing and connecting means.

As shown in FIG. 1, a dual seat structure according to the invention comprises a tubular frame which comprises three main tube members bent to similar shapes and disposed in spaced parallel plane. Each tube member comprises an upstanding rear portion 1a which is somewhat inclined rearwardly from the vertical in at least the upper part of its length, a horizontal lower portion 1b for standing the structure on the floor surface, an upstanding front portion 1c which is somewhat inclined forwardly from the vertical, and a substantially horizontal portion 1d extending to the free end of the tube member which free end is welded to the upstanding portion 1a at an intermediate elevation thereof as shown. The three tube members are interconnected in their spaced relationship mentioned above by means of an upper and rear cross member 2 which is also shown tubular and is welded to the rearwardly and downwardly bent upper end portions of the respective portions 1a. There are three further horizontal interconnecting cross members 3 and 4, cross member 3 being welded to the base portions 1b near the rear ends thereof and cross member 4 being welded to the front upright portions 1c near the upper ends thereof.

Stretched over the back and seat portions of the rigid armature thus provided are respective strong fabric webbing elements which provide resilient load transfer means to the frame. Only the webbing element 5 relating to the back of the seat structure is shown in FIGS. 2–4 and will be described in detail; it being understood that the seat webbing element is generally similar and similarly mounted. The rear webbing element 5 may be any natural or synthetic textile fabric of suitable characteristics. Resilient means are provided for connecting it to the tubular frame structure, and as shown such means comprise a set of deformable rings 7 of rubber or equivalent elastic material connected by way of outer metallic hooks 8 to the upright frame sections 1a, and by way of inner metal hooks 6 to the webbing element 5. The outer hooks 8 have their outer ends engaged in spaced holes formed in the upright tubular frame portions 1a. The inner hooks 6 have their inner ends engaged around reinforcing cord 34 passed through hems of the webbing 5. The webbing element 5 is extended in the vicinity of each of the upright tube members 1a beyond the points of attachment of the hooks 6 therewith, so as to provide a kind of gusset as shown at 5a in FIG. 4 which extends substantially as the related frame portion 1a or somewhat beyond. The similar webbing element stretched over the seat portion of the structure is attached to the horizontal tube sections 1d in a manner similar to the described attachment with the upright tube sections 1a. Preferably, in the seat fabric element attaching means, there are provided a proportionally greater number of attaching assemblies such as 6—7—8 toward the centre of the seat structure to ensure that sag will occur in a substantially vertical direction rather than laterally.

Fitted over the webbing elements just described is a prefabricated, pre-shaped padding assembly generally designated 10 and shown in dot-dash outline in FIG. 1. The padding 10 may comprise any resilient material, e. g. expanded or foam plastic, and may include a reinforced core 11 of conglomerate fiber or the like. As shown in FIG. 1, the padding comprises the side walls such as 10a. Thus the general appearance of the seat structure as seen from all sides is that of a conventional sprung carcass seat structure, while being substantially less expensive and easier to produce and more lightweight.

Positioned over the padding 10 is a cover element 12 which may be of any suitable flexible, somewhat resilient material. The side margins of the cover 12 have stitched hems through which stiffener cords 13 are passed. The sides of the cover are looped around the frame side members 1a as shown in FIG. 4 and attached in position e.g. by means of metal fasteners 14 passed around the cord 13 and around all or some of the adjacent hooks 8. The upper margin of cover 12 is similarly fastened in position, except that in this case the fastener rings 14 are engaged around a rod 15 extending parallel to upper cross member 2 and spaced therefrom, similarly in connection with the seat portion of the structure, the related marginal edge of the cover is attached through fasteners similar to 14 to suitable bracket members such as shown at 16 and 17, the members 16 being secured to frame portions 1c in parallel spaced relation therewith, while members 17 are similarly carried by an auxiliary frame member 31 interconnecting the frame portions 1a and 1c at an elevation intermediate between that of member 1b and that of member 1d. Preferably, the cover means include a rear cover section shown at 12a in FIG. 4 which is connected with the main cover 12, the connection being preferably such that the cover section 12a is permanently bonded, e.g. stitched, to the main cover 12 along only a single one of its sides, e.g. along its upper margin, while the connection along one or more other margins is detachable, e.g. by means of buttons, slide-fasteners or the like, to provide for quick and easy access to the base fabric element 5 without having to remove the entire cover.

In the alternative construction shown in FIGS. 5 to 8, the tubular frame structure comprises a generally horizontal rectangular frame member 18 which is shaped with an upward camber in the forward direction as shown so that the rearwardly extending long side 21 of the rectangle may rest on the floor surface, while the opposite or forward long side is spaced above said surface, and rests thereon by way of spaced upright tubular leg members 19. Welded to the respective sides of the rectangular frame member near the rear thereof are the opposite ends of a single, doublebent tube member which includes, generally, a horizontal upper section 20a and two generally upstanding, parallel inclined side portions 20b and 20c. In this construction there is no separation between the two seats of the structure. An upstanding cross member 22 is shown interconnecting the midpoints of the frame portions 21 and 20a. Further, auxiliary members 23 are shown attached to the ends of, and extending in generally rearwardly spaced relation to the side members 20b and 20c.

Stretched over the frame structure described is a webbing element generally similar to element 5 described in the first embodiment. In this case however, it is noted that the webbing 5 stretched across the back of the structure (see FIG. 6) is provided with a central gusset 5a which is retained in shape by means of the auxiliary hooks 24 having their opposite ends engaging with suitable points of the web 5 e.g. in the manner described with reference to hooks 6 and retained by means of bridging fabric element 25. Interposed between the rear of the central gusset 5a and the upstanding rear cross member 22 is an elongated cushioning member 26 containing spring means 27 therein.

Figure 8:
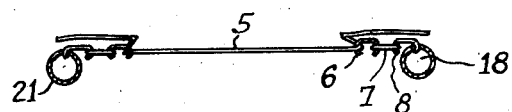
FIG. 8 is a similar view in section on line VIII—VIII of FIG. 7.
Figure 9:
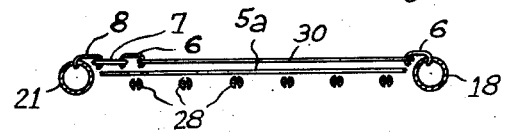
FIG. 9 is a sectional view on line IX—IX of FIG. 7.

Whereas in the embodiment of FIGS. 1–4 the web provided in the seat portion of the structure was resiliently attached to the frame structure exclusively at the lateral side edges thereof, in the embodiment now described the corresponding webbing is, in addition, attached along its longitudinal margins to the frame portions 18 and 21 as shown in FIG. 8, using the same resilient arrangement involving rubber rings 7 and hooks 6 and 8 as earlier described.

While as indicated above in this embodiment the frame 18 is not provided with an intermediate cross member for separating the two seats of the structure, the webbing 5 stretched over the seat portion is provided along its midline with a gusset 5a of the kind previously described, retained in shape by means of deformable rubber rings 28 connected with the web 5 at the opposite sides of the gusset by means of hooks 29. Provided over the gusset is a strip of cover fabric 30. One end of this strip is directly attached through the hooks 6 to the front tube member of frame 18, while the other end of the strip is secured to the opposite frame side 21 through rubber rings 7 and hooks 6 and 8. This arrangement is advantageous in that it prevents excessive sag of the web in its central seating portion under the weight of the occupants, and thus averts an uncomfortable downward slope or sag of the seat in both directions towards the center, which would otherwise cause the occupant to tend to slip continually toward the center of the dual seat structure.

For the last described purpose of preventing such inward sag, another means usable instead of or in addition to the means just described is to provide the central portion of the padding with an enlargement or ridge thus providing an effective separation between the two seats. The outer sides of the frame may similarly include ridges.

Similar arrangements as those described with reference to FIGS. 5 to 8 may be applied in cases where the seat frame includes a central cross member of the kind provided in FIG. 1. In such case the central enlargement or ridge of the padding would overlie the central cross member, so that in case of need three passengers can use the two-seat structure shown. Such an arrangement is illustrated in FIG. 10 in which the tubular frame structure including the three spaced horizontal cross members 1d may be the same as that shown in FIG. 1. A web 5 is stretched over the frame by means of the rubber rings 7 and hooks 6 and 8 as described. Over the web is fitted a prefabricated preshaped padding 10 and a covering 12. The padding 10 has an enlargement or ridge 10a in its central portion as well as side enlargements 10b. Thus each of the two seats is provided with a depression making for increased comfort and stability of the seated passengers. In this modification, moreover, the gussets such as 5a are omitted and separate protective strips of webbing 33 are shown instead, which may be bonded to the underside of the padding 10.

It will be understood that various modifications and departures from the structure illustrated and described may be introduced without departing from the scope of the invention.

What I claim is:

1. A seat structure comprising a rigid frame with a seat portion and a back portion, webbing stretched across said frame seat portion and back portion, deformable rings of elastic, rubber-like material, hooks connecting the opposite sides of said rings to edge portions of said webbing and to said frame, respectively, and a pre-shaped padding structure fitted over the seat and back portions of the frame and over said webbing and supported by the latter.

2. A seat structure comprising a rigid frame with a seat portion and a back portion, webbing stretched across said seat portion and back portion of the frame and having gussets adjacent edge portions of the webbing, resilient connector means connecting said edge portions of the webbing with said frame, and a pre-shaped padding structure fitted over the seat and back portions of the frame and over said webbing and being supported by the latter.

3. A seat structure comprising a rigid frame with a seat portion and a back portion, webbing stretched across said seat portion and back portion of the frame, resilient connector means connecting edge portions of said webbing with said frame at spaced apart locations along said edge portions and being more closely spaced centrally of said seat portion than at the sides of the latter, and a pre-shaped padding structure fitted over the seat and back portions of said frame and over said webbing and being supported by the latter.

4. A seat structure comprising a rigid frame with a seat portion and a back portion, webbing stretched across said seat portion and back portion of the frame and having reinforcing cord in the webbing, resilient connector means engaging said reinforcing cord of the webbing and connecting edge portions of the latter with said frame, and a pre-shaped padding structure fitted over the seat and back portions of said frame and over said webbing and being supported by the latter.

5. A two-seater structure comprising a rigid frame having two parts each defining a seat structure with a seat portion and a back portion, a common webbing stretched across said seat portion and back portion of both of said parts of the frame, resilient connector means connecting edge portions of said webbing with said frame, and a common pre-shaped padding structure fitted over the seat and back portions of both of said parts of the frame and over said webbing and being supported by the latter.

6. A two-seater structure as in claim 5; wherein the seat portions of both of said parts of the frame are continuous with one another.

7. A two-seater structure as in claim 5; wherein said frame has a central cross-member; and further comprising spring-cushioning means interposed between said webbing and said central cross-member.

8. A two-seater structure as in claim 5; wherein said frame has a central cross-member, and said padding structure has a ridge formed thereon at least adjacent said central cross-member of the frame.

9. A seat structure comprising a rigid frame with a seat portion and a back portion, a first webbing stretched across said seat portion of the frame, resilient connector means connecting at least the opposite sides of said first webbing to said seat portion of the frame and tensioning said first webbing, a second webbing stretched across said back portion of the frame, resilient connector means connecting at least the opposite sides of said second webbing to said back portion of the frame and tensioning said second webbing, and a pre-shaped padding structure fitted over said seat and back portions of the frame and over said first and second webbings and being supported by the latter.

References Cited in the file of this patent

UNITED STATES PATENTS

| | | |
|---|---|---|
| 2,553,042 | Hoven et al. | May 15, 1951 |
| 2,567,550 | Clark et al. | Sept. 11, 1951 |
| 2,760,561 | Hendrickson et al. | Aug. 28, 1956 |
| 2,860,691 | Caesar | Nov. 18, 1958 |
| 2,865,436 | Thorne | Dec. 23, 1958 |

FOREIGN PATENTS

| | | |
|---|---|---|
| 1,063,043 | Germany | Aug. 6, 1959 |